(12) United States Patent
Odell et al.

(10) Patent No.: US 9,575,568 B2
(45) Date of Patent: Feb. 21, 2017

(54) MULTI-FUNCTION KEYS PROVIDING ADDITIONAL FUNCTIONS AND PREVIEWS OF FUNCTIONS

(71) Applicant: SYNAPTICS INCORPORATED, San Jose, CA (US)

(72) Inventors: Daniel L. Odell, San Jose, CA (US); Justin Mockler, Santa Clara, CA (US); Mohamed Ashraf Sheik-Nainar, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/268,064

(22) Filed: May 2, 2014

(65) Prior Publication Data

US 2015/0022453 A1    Jan. 22, 2015

Related U.S. Application Data

(60) Provisional application No. 61/818,564, filed on May 2, 2013, provisional application No. 61/819,679, filed on May 6, 2013.

(51) Int. Cl.
*G06F 3/02*     (2006.01)
*G06F 3/041*    (2006.01)
*H01H 3/02*     (2006.01)

(52) U.S. Cl.
CPC ........... *G06F 3/0227* (2013.01); *G06F 3/0202* (2013.01); *G06F 3/041* (2013.01); *G06F 3/0414* (2013.01);
(Continued)

(58) Field of Classification Search
None
See application file for complete search history.

(56) References Cited

U.S. PATENT DOCUMENTS

| | | | | |
|---|---|---|---|---|
| 5,311,175 A | * | 5/1994 | Waldman | G06F 3/023 341/22 |
| 5,341,133 A | * | 8/1994 | Savoy | G06F 3/002 250/208.4 |

(Continued)

OTHER PUBLICATIONS

Rekimoto et al., "SmartPad: A Finger-Sensing Keypad for Mobile Interaction", CHI 2003: New Horizons—Short Talk: Haptic Interfaces, pp. 850-851.*

(Continued)

*Primary Examiner* — Joseph Feild
*Assistant Examiner* — Karin Kiyabu
(74) *Attorney, Agent, or Firm* — Osha Liang LLP

(57) ABSTRACT

Methods and devices are disclosed for providing additional functionality using multi-function keys. The device includes key assemblies for receiving a contact input or a press input. A processing system is coupled to the key assemblies and configured to determine a number of objects contacting a key assembly. The processing system provides a first response when the key assembly has received the press input from a first number of objects and provides a second response when key assembly has received the press input from a second number of objects. The method includes determining a number of objects contacting a key assembly and whether the key assembly has received a contact input or a press input. A first response is provided when the key assembly has received the press input from a first number of objects and a second function is provided when key assembly has received the press input from a second number of objects.

20 Claims, 10 Drawing Sheets

(52) U.S. Cl.
CPC ...... *H01H 2003/0293* (2013.01); *H01H 2239/006* (2013.01)

(56) References Cited

U.S. PATENT DOCUMENTS

| | | | | |
|---|---|---|---|---|
| 5,825,352 | A * | 10/1998 | Bisset | G06F 3/044 345/157 |
| 6,489,976 | B1 | 12/2002 | Patil et al. | |
| 6,976,215 | B1 * | 12/2005 | Roderick | G06F 3/016 345/184 |
| 2002/0109671 | A1 * | 8/2002 | Kawasome | G06F 3/023 345/156 |
| 2002/0135619 | A1 * | 9/2002 | Allport | H04N 21/42228 715/810 |
| 2004/0239638 | A1 | 12/2004 | Swanson et al. | |
| 2006/0253793 | A1 * | 11/2006 | Zhai | G06F 3/04883 715/773 |
| 2007/0129046 | A1 * | 6/2007 | Soh | H04M 1/23 455/403 |
| 2008/0316183 | A1 | 12/2008 | Westerman et al. | |
| 2009/0027347 | A1 * | 1/2009 | Wakefield et al. | 345/172 |
| 2009/0058687 | A1 | 3/2009 | Rothkopf et al. | |
| 2009/0153495 | A1 * | 6/2009 | Chen | G06F 3/04847 345/173 |
| 2011/0291942 | A1 | 12/2011 | Chen et al. | |
| 2012/0030606 | A1 * | 2/2012 | Zhang | G06F 3/0234 715/773 |
| 2012/0096393 | A1 * | 4/2012 | Shim et al. | 715/784 |
| 2012/0326961 | A1 | 12/2012 | Bromer | |
| 2013/0063286 | A1 * | 3/2013 | Elias | G06F 3/044 341/33 |
| 2013/0307788 | A1 * | 11/2013 | Rao | G06F 3/0488 345/173 |
| 2014/0062914 | A1 * | 3/2014 | Lin | G06F 3/0485 345/173 |
| 2014/0078063 | A1 * | 3/2014 | Bathiche | G06F 3/0234 345/168 |
| 2014/0160035 | A1 * | 6/2014 | Sauer et al. | 345/173 |
| 2014/0327621 | A1 * | 11/2014 | Faggin | G06F 3/0202 345/168 |
| 2016/0063236 | A1 * | 3/2016 | Masuko | G06F 21/31 726/18 |

OTHER PUBLICATIONS

Hinckley, Ken, "MagicKeys: Touch-Sensitive Tooltips for Hardware," Unpublished Manuscript, Feb. 13, 2002.
Final Office Action or U.S. Appl. No. 14/013,322, dated Aug. 5, 2016, 19 pages.

* cited by examiner

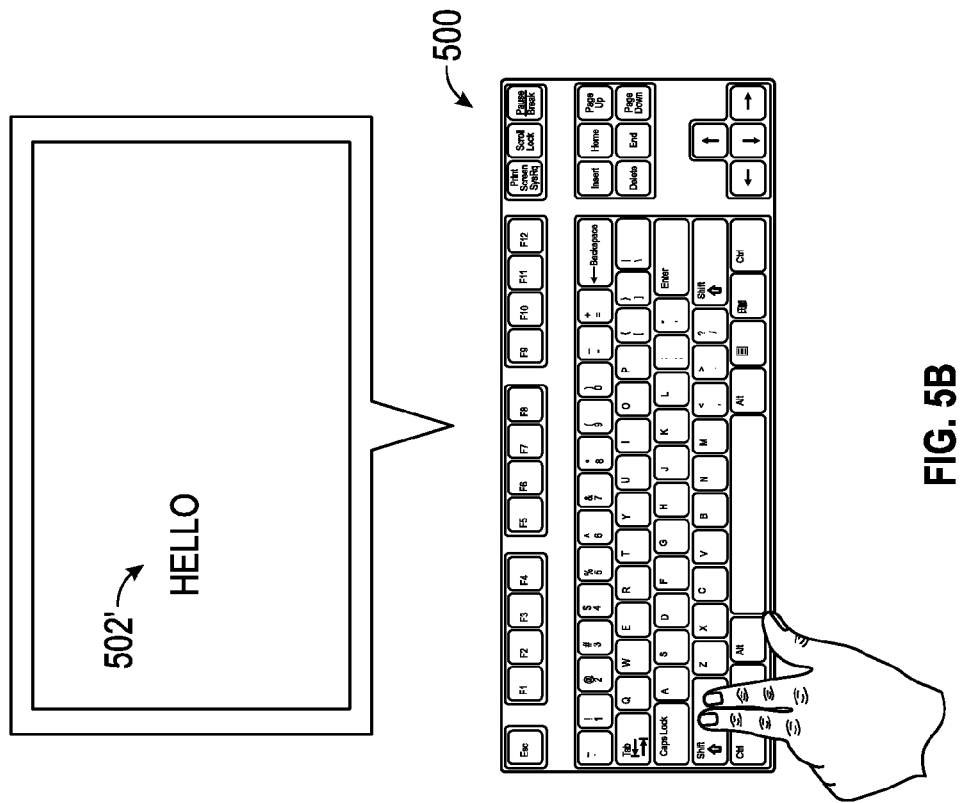
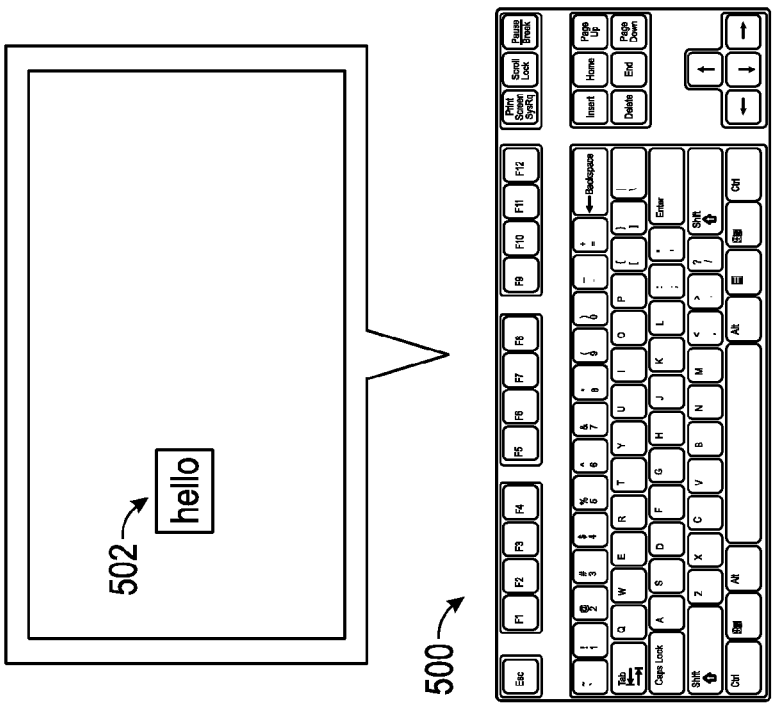
FIG. 5A
FIG. 5B

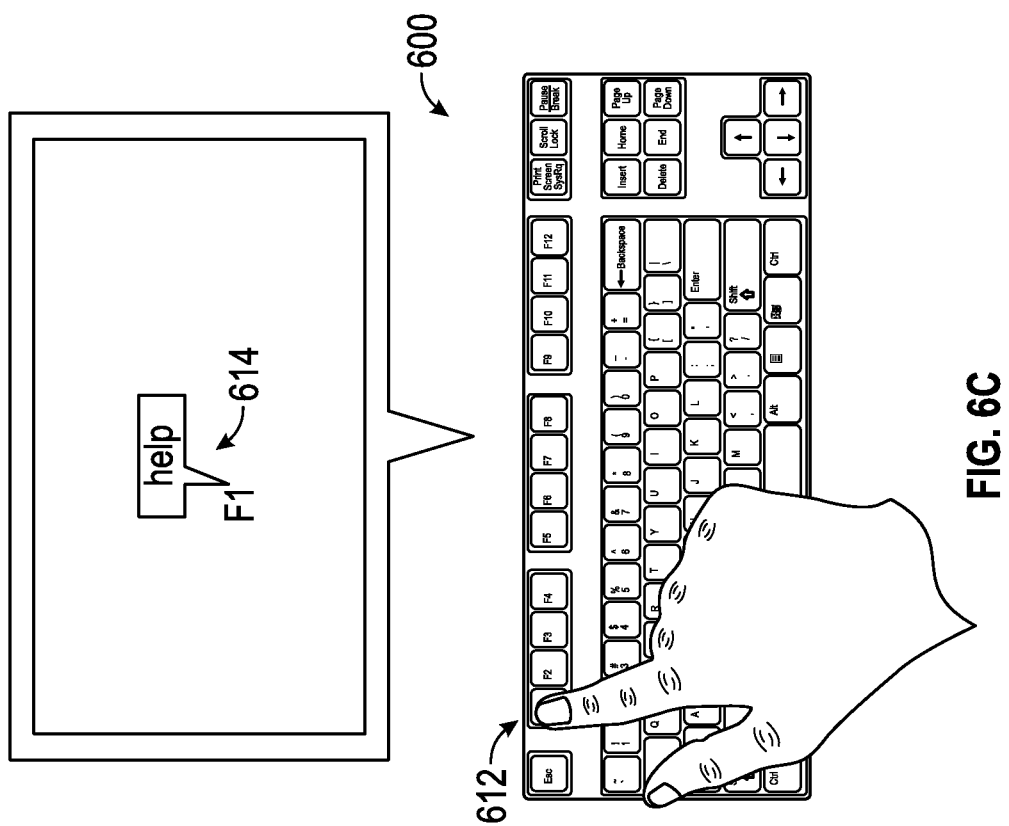

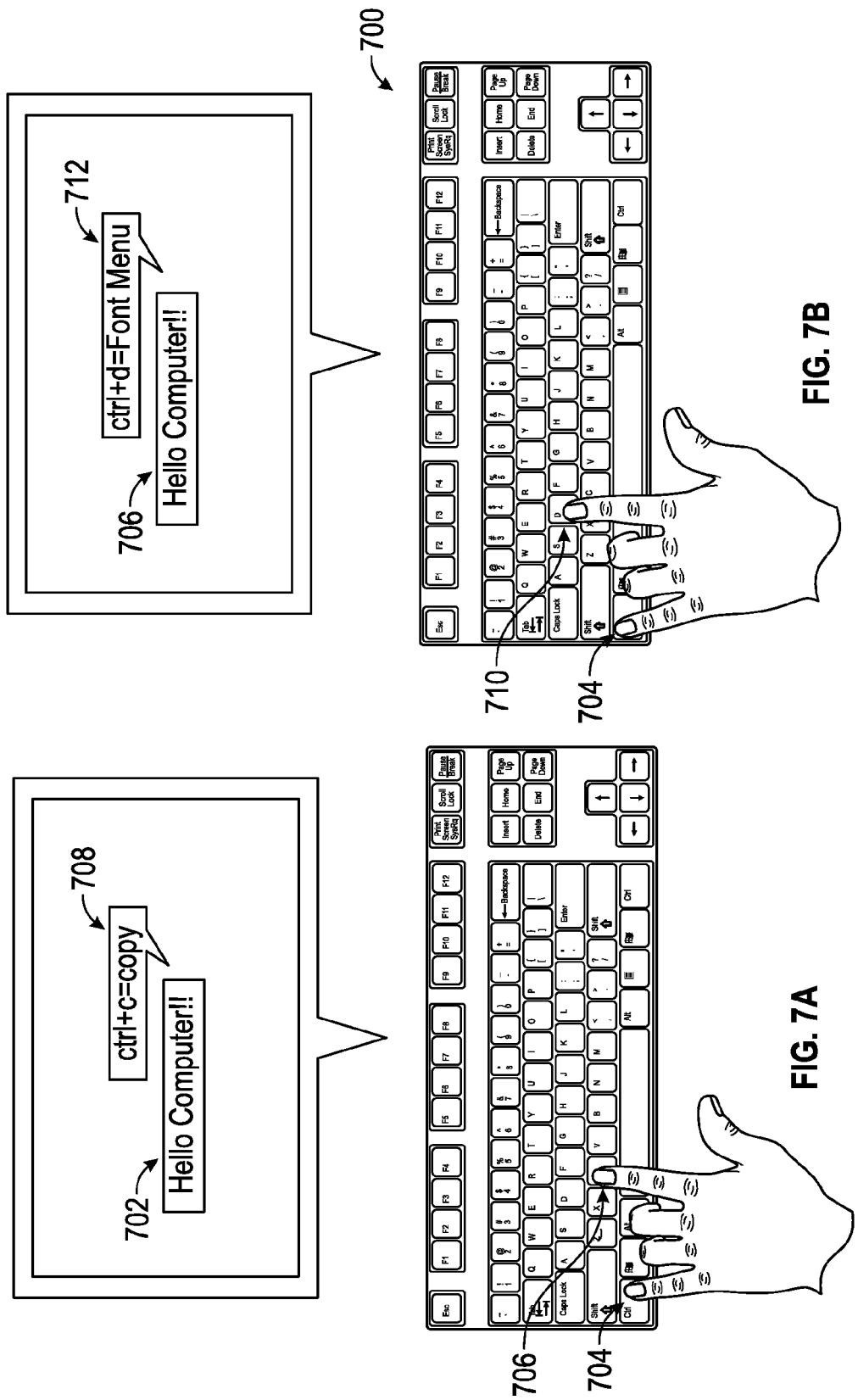

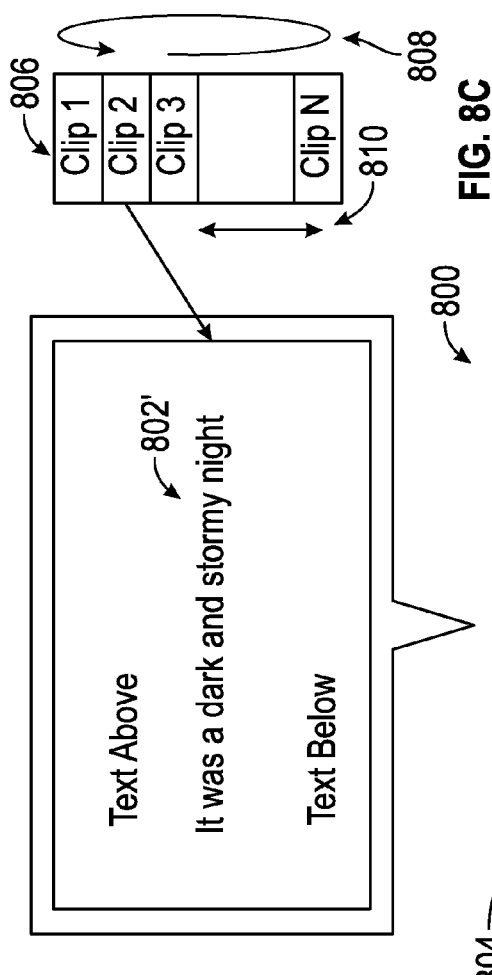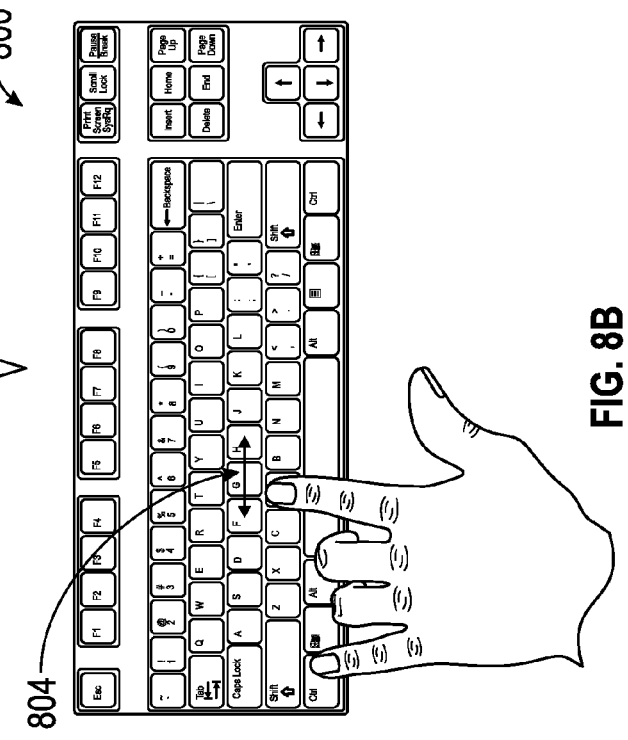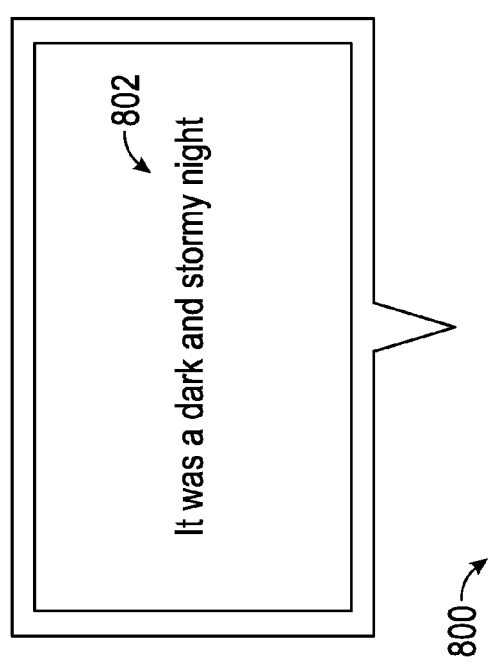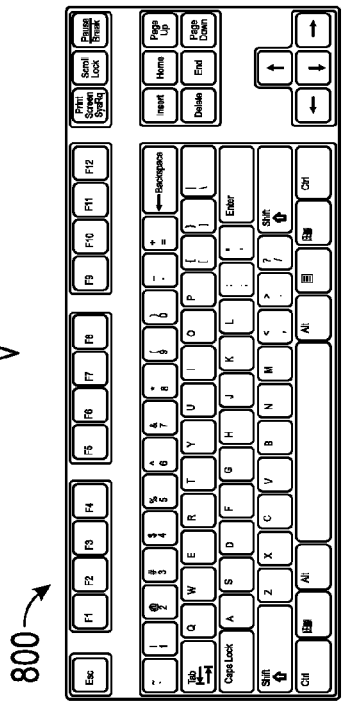
FIG. 8A
FIG. 8B
FIG. 8C

MULTI-FUNCTION KEYS PROVIDING ADDITIONAL FUNCTIONS AND PREVIEWS OF FUNCTIONS

RELATED APPLICATION(S)

This application claims priority to provisional patent application 61/818,564 filed May 2, 2013 and to provisional patent application 61/819,679 filed May 6, 2013.

FIELD OF THE INVENTION

This invention generally relates to electronic devices.

BACKGROUND OF THE INVENTION

Pressable touchsurfaces (touch surfaces which can be pressed) are widely used in a variety of input devices, including as the surfaces of keys or buttons for keypads or keyboards, and as the surfaces of touch pads or touch screens. It is desirable to improve the usability of these input systems.

BRIEF SUMMARY OF THE INVENTION

An input device is disclosed for providing additional functionality using multi-function keys. The input device includes a plurality of key assemblies for receiving a contact input or a press input. A processing system is coupled to the plurality of key assemblies and configured to determine a number of objects contacting a respective key assembly of the plurality of key assemblies and whether the respective key assembly has received the contact input or the press input from the number of objects. The processing system provides a first response when the respective key assembly has received the press input from a first number of objects and provides a second response when respective key assembly has received the press input from a second number of objects.

A method is disclosed for providing additional functionality using multi-function keys. The method includes determining a number of objects contacting a key assembly and whether the respective key assembly has received a contact input or a press input from the number of objects. A first response is provided when the key assembly has received the press input from a first number of objects and a second function is provided when respective key assembly has received the press input from a second number of objects.

BRIEF DESCRIPTION OF DRAWINGS

Example embodiments of the present invention will hereinafter be described in conjunction with the appended drawings which are not to scale unless otherwise noted, where like designations denote like elements, and:

FIGS. 3-8A-C are illustrations of an input device in accordance with the techniques described herein.

DETAILED DESCRIPTION OF THE INVENTION

The following detailed description is merely exemplary in nature and is not intended to limit the invention or the application and uses of the invention.

Various embodiments of the present invention provide input devices and methods that facilitate improved usability, thinner devices, easier assembly, lower cost, more flexible industrial design, or a combination thereof. These input devices and methods involve pressable touchsurfaces that may be incorporated in any number of devices. As some examples, pressable touchsurfaces may be implemented as surfaces of touchpads, touchscreens, keys, buttons, and the surfaces of any other appropriate input device. Thus, some non-limiting examples of devices that may incorporate pressable touchsurfaces include personal computers of all sizes and shapes, such as desktop computers, laptop computers, netbooks, ultrabooks, tablets, e-book readers, personal digital assistants (PDAs), and cellular phones including smart phones. Additional example devices include data input devices (including remote controls, integrated keyboards or keypads such as those within portable computers, or peripheral keyboards or keypads such as those found in tablet covers or stand-alone keyboards, control panels, and computer mice), and data output devices (including display screens and printers). Other examples include remote terminals, kiosks, point-of-sale devices, video game machines (e.g., video game consoles, portable gaming devices, and the like) and media devices (including recorders, editors, and players such as televisions, set-top boxes, music players, digital photo frames, and digital cameras).

The discussion herein focuses largely on rectangular touchsurfaces. However, the touchsurfaces for many embodiments can comprises other shapes. Example shapes include triangles, quadrilaterals, pentagons, polygons with other numbers of sides, shapes similar to polygons with rounded corners or nonlinear sides, shapes with curves, elongated or circular ellipses circles, combinations shapes with portions of any of the above shapes, non-planar shapes with concave or convex features, and any other appropriate shape.

In addition, although the discussion herein focuses largely on the touchsurfaces as being atop rigid bodies that undergo rigid body motion, some embodiments may comprise touchsurfaces atop pliant bodies that deform. "Rigid body motion" is used herein to indicate motion dominated by translation or rotation of the entire body, where the deformation of the body is negligible. Thus, the change in distance between any two given points of the touchsurface is much smaller than an associated amount of translation or rotation of the body.

Also, in various implementations, pressable touchsurfaces may comprise opaque portions that block light passage, translucent or transparent portions that allow light passage, or both.

Figure 1:
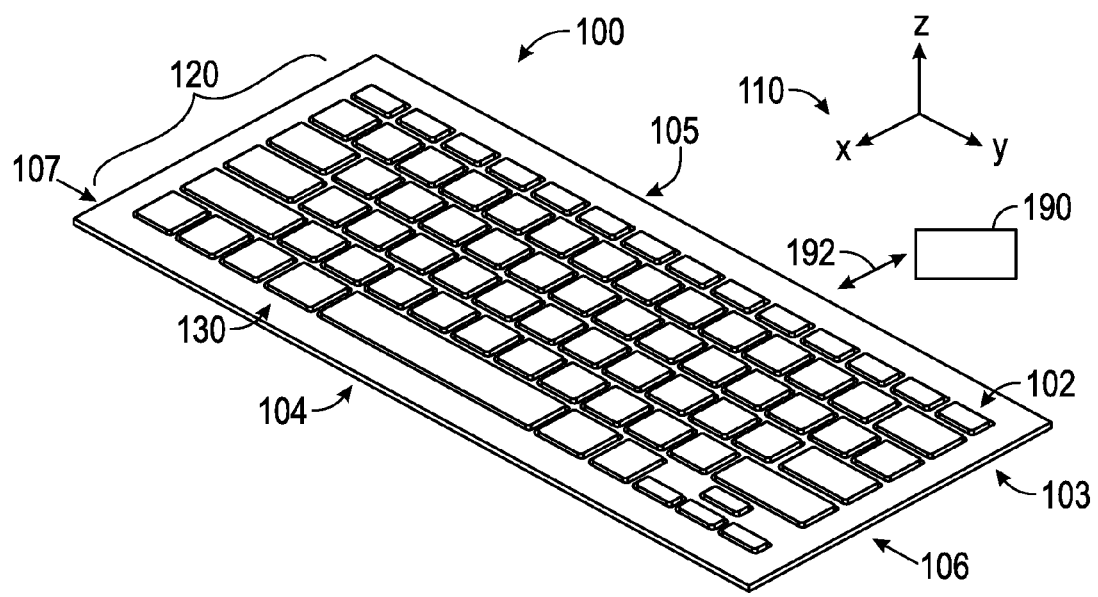
FIG. 1 shows an example keyboard that incorporates one or more implementations of key-based touchsurfaces configured in accordance with the techniques described herein.

FIG. 1 shows an example keyboard 100 that incorporates a plurality of (two or more) pressable key-based touchsurfaces configured in accordance with the techniques described herein. The example keyboard 100 comprises rows of keys 120 of varying sizes surrounded by a keyboard bezel 130. Keyboard 100 has a QWERTY layout, even though the keys 120 are not thus labeled in FIG. 1. Other keyboard embodiments may comprise different physical key shapes, key sizes, key locations or orientations, or different key layouts such as DVORAK layouts or layouts designed for use with special applications or non-English languages. In some embodiments, the keys 120 comprise keycaps that are rigid bodies, such as rigid rectangular bodies having greater width and breadth than depth (depth being in the Z direction as explained below). Also, other keyboard embodiments may comprise a single pressable key-based touchsurface configured in accordance with the techniques described herein, such that the other keys of these other keyboard embodiments are configured with other techniques.

Orientation terminology is introduced here in connection with FIG. 1, but is generally applicable to the other discussions herein and the other figures unless noted otherwise. This terminology introduction also includes directions associated with an arbitrary Cartesian coordinate system. The arrows 110 indicate the positive directions of the Cartesian coordinate system, but do not indicate an origin for the coordinate system. Definition of the origin will not be needed to appreciate the technology discussed herein.

The face of keyboard 100 including the exposed touchsurfaces configured to be pressed by users is referred to as the "top" 102 of the keyboard 100 herein. Using the Cartesian coordinate directions indicated by the arrows 110, the top 102 of the keyboard 100 is in the positive-Z direction relative to the bottom 103 of the keyboard 100. The part of the keyboard 100 that is typically closer to the body of a user when the keyboard 100 is in use atop a table top is referred to as the "front" 104 of the keyboard 100. In a QWERTY layout, the front 104 of the keyboard 100 is closer to the space bar and further from the alphanumeric keys. Using the Cartesian coordinate directions indicated by the arrows 110, the front 104 of the keyboard 100 is in the positive-X direction relative to the back 105 of the keyboard 100. In a typical use orientation where the top 102 of the keyboard 100 is facing upwards and the front 104 of the keyboard 100 is facing towards the user, the "right side" 106 of the keyboard 100 is to the right of a user. Using the Cartesian coordinate directions indicated by the arrows 110, the right side 106 of the keyboard 100 is in the positive-Y direction relative to the "left side" 107 of the keyboard 100. With the top 102, front 104, and right side 106 thus defined, the "bottom" 103, "back" 105, and "left side" 107 of the keyboard 100 are also defined.

Using this terminology, the press direction for the keyboard 100 is in the negative-Z direction, or vertically downwards toward the bottom of the keyboard 100. The X and Y directions are orthogonal to each other and to the press direction. Combinations of the X and Y directions can define an infinite number of additional lateral directions orthogonal to the press direction. Thus, example lateral directions include the X direction (positive and negative), the Y direction (positive and negative), and combination lateral directions with components in both the X and Y directions but not the Z direction. Motion components in any of these lateral directions is sometimes referred herein as "planar," since such lateral motion components can be considered to be in a plane orthogonal to the press direction.

Some or all of the keys of the keyboard 100 are configured to move between respective unpressed and pressed positions that are spaced in the press direction and in a lateral direction orthogonal to the press direction. That is, the touchsurfaces of these keys exhibit motion having components in the negative Z-direction and in a lateral direction. In the examples described herein, the lateral component is usually in the positive X-direction or in the negative X-direction for ease of understanding. However, in various embodiments, and with reorientation of select key elements as appropriate, the lateral separation between the unpressed and the pressed positions may be solely in the positive or negative X-direction, solely in the positive or negative Y-direction, or in a combination with components in both the X and Y directions.

Thus, these keys of the keyboard 100 can be described as exhibiting "diagonal" motion from the unpressed to the pressed position. This diagonal motion is a motion including both a "Z" (or vertical) translation component and a lateral (or planar) translation component. Since this planar translation occurs with the vertical travel of the touchsurface, it may be called "planar translational responsiveness to vertical travel" of the touchsurface, or "vertical-lateral travel."

Some embodiments of the keyboard 100 comprise keyboards with leveled keys that remain, when pressed during normal use, substantially level in orientation through their respective vertical-lateral travels. That is, the keycaps of these leveled keys (and thus the touchsurfaces of these keys) exhibit little or no rotation along any axes in response to presses that occur during normal use. Thus, there is little or no roll, pitch, and yaw of the keycap and the associated touchsurfaces remain relatively level and substantially in the same orientation during their motion from the unpressed position to the pressed position.

In various embodiments, the lateral motion associated with the vertical-lateral travel can improve the tactile feel of the key by increasing the total key travel for a given amount of vertical travel in the press direction. In various embodiments, the vertical-lateral travel also enhances tactile feel by imparting to users the perception that the touchsurface has travelled a larger vertical distance than actually travelled. For example, the lateral component of vertical-lateral travel may apply tangential friction forces to the skin of a finger pad in contact with the touchsurface, and cause deformation of the skin and finger pad that the user perceives as additional vertical travel. This then creates a tactile illusion of greater vertical travel. In some embodiments, returning the key from the pressed to the unpressed position on the return stroke also involves simulating greater vertical travel using lateral motion.

To enable the keys 120 of the keyboard 100 with vertical-lateral travel, the keys 120 are parts of key assemblies each comprising mechanisms for effecting planar translation, readying the key 120 by holding the associated keycap in the unpressed position, and returning the key 120 to the unpressed position. Some embodiments further comprise mechanisms for leveling keycaps. Some embodiments achieve these functions with a separate mechanism for each function, while some embodiments achieve two or more of these functions using a same mechanism. For example, a "biasing" mechanism may provide the readying function, the returning function, or both the readying and returning functions. Mechanisms which provide both readying and returning functions are referred to herein as "ready/return" mechanisms. As another example, a leveling/planar-translation-effecting mechanisms may level and effect planar translation. As further examples, other combinations of functions may be provided by a same mechanism.

The keyboard 100 may use any appropriate technology for detecting presses of the keys of the keyboard 100. For example, the keyboard 100 may employ a key switch matrix based on conventional resistive membrane switch technology. The key switch matrix may be located under the keys 120 and configured to generate a signal to indicate a key press when a key 120 is pressed. Alternatively, the example keyboard 100 may employ other key press detection technology to detect any changes associated with the fine or gross change in position or motion of a key 120. Example key press detection technologies include various capacitive, resistive, inductive, magnetic, force or pressure, linear or angular strain or displacement, temperature, aural, ultrasonic, optical, and other suitable techniques. With many of these technologies, one or more preset or variable thresholds may be defined for identifying presses and releases.

As a specific example, capacitive sensor electrodes may be disposed under the touchsurfaces, and detect changes in capacitance resulting from changes in press states of touchsurfaces. The capacitive sensor electrodes may utilize "self capacitance" (or "absolute capacitance") sensing methods based on changes in the capacitive coupling between the sensor electrodes and the touchsurface. In some embodiments, the touchsurface is conductive in part or in whole, or a conductive element is attached to the touchsurface, and held at a constant voltage such as system ground. A change in location of the touchsurface alters the electric field near the sensor electrodes below the touchsurface, thus changing the measured capacitive coupling. In one implementation, an absolute capacitance sensing method operates with a capacitive sensor electrode underlying a component having the touchsurface, modulates that sensor electrodes with respect to a reference voltage (e.g., system ground), and detects the capacitive coupling between that sensor electrode and the component having the touchsurface for gauging the press state of the touchsurface.

Some capacitive implementations utilize "mutual capacitance" (or "transcapacitance") sensing methods based on changes in the capacitive coupling between sensor electrodes. In various embodiments, the proximity of a touchsurface near the sensor electrodes alters the electric field between the sensor electrodes, thus changing the measured capacitive coupling. The touchsurface may be a conductive or non-conductive, electrically driven or floating, as long as its motion causes measurable change in the capacitive coupling between sensor electrodes. In some implementations, a transcapacitive sensing method operates by detecting the capacitive coupling between one or more transmitter sensor electrodes (also "transmitters") and one or more receiver sensor electrodes (also "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In one implementation, a trans-capacitance sensing method operates with two capacitive sensor electrodes underlying a touchsurface, one transmitter and one receiver. The resulting signal received by the receiver is affected by the transmitter signal and the location of the touchsurface.

In some embodiments, the sensor system used to detect touchsurface presses may also detect pre-presses. For example, a capacitive sensor system may also be able to detect a user hovering over but not contacting a touch surface. As another example, a capacitive sensor system may be able to detect a user lightly touching a touchsurface, such that the user performs a non-press contact on the touchsurface, and does not depress the touchsurface sufficiently to be considered a press. Some embodiments are configured to gauge the amount of force being applied on the touchsurface from the effect that the force has on the sensor signals. That is, the amount of depression of the touchsurface is correlated with one or more particular sensor readings, such that the amount of press force can be determined from the sensor reading(s). These types of systems can support multi-stage touchsurface input by distinguishing and responding differently to two or more of the following: non-contact hover, non-press contact, and one, two, or more levels of press.

In some embodiments, substrates used for sensing are also used to provide backlighting associated with the touchsurfaces. As a specific example, in some embodiments utilizing capacitive sensors underlying the touchsurface, the capacitive sensor electrodes are disposed on a transparent or translucent circuit substrate such as polyethylene terephthalate (PET), another polymer, or glass. Some of those embodiments use the circuit substrate as part of a light guide system for backlighting symbols viewable through the touchsurfaces.

The keyboard 100 may be communicably coupled with a processing system 190 through communications channel 192. Connection 192 may be wired or wireless. The processing system 190 may comprise one or more ICs (integrated circuits) having appropriate processor-executable instructions for operating the keyboard 100, such as instructions for operating key press sensors, processing sensor signals, responding to key presses, and the like. In some embodiments, the keyboard 100 is integrated in a laptop computer or a tablet computer cover, and the processing system 190 comprises an IC containing instructions to operate keyboard sensors to determine the extent keys has been touched or pressed, and to provide an indication of touch or press status to a main CPU of the laptop or tablet computer, or to a user of the laptop or tablet computer.

While the orientation terminology, vertical-lateral travel, sensing technology, and implementation options discussed here focuses on the keyboard 100, these discussions are readily analogized to other touchsurfaces and devices described herein.

Figure 2:
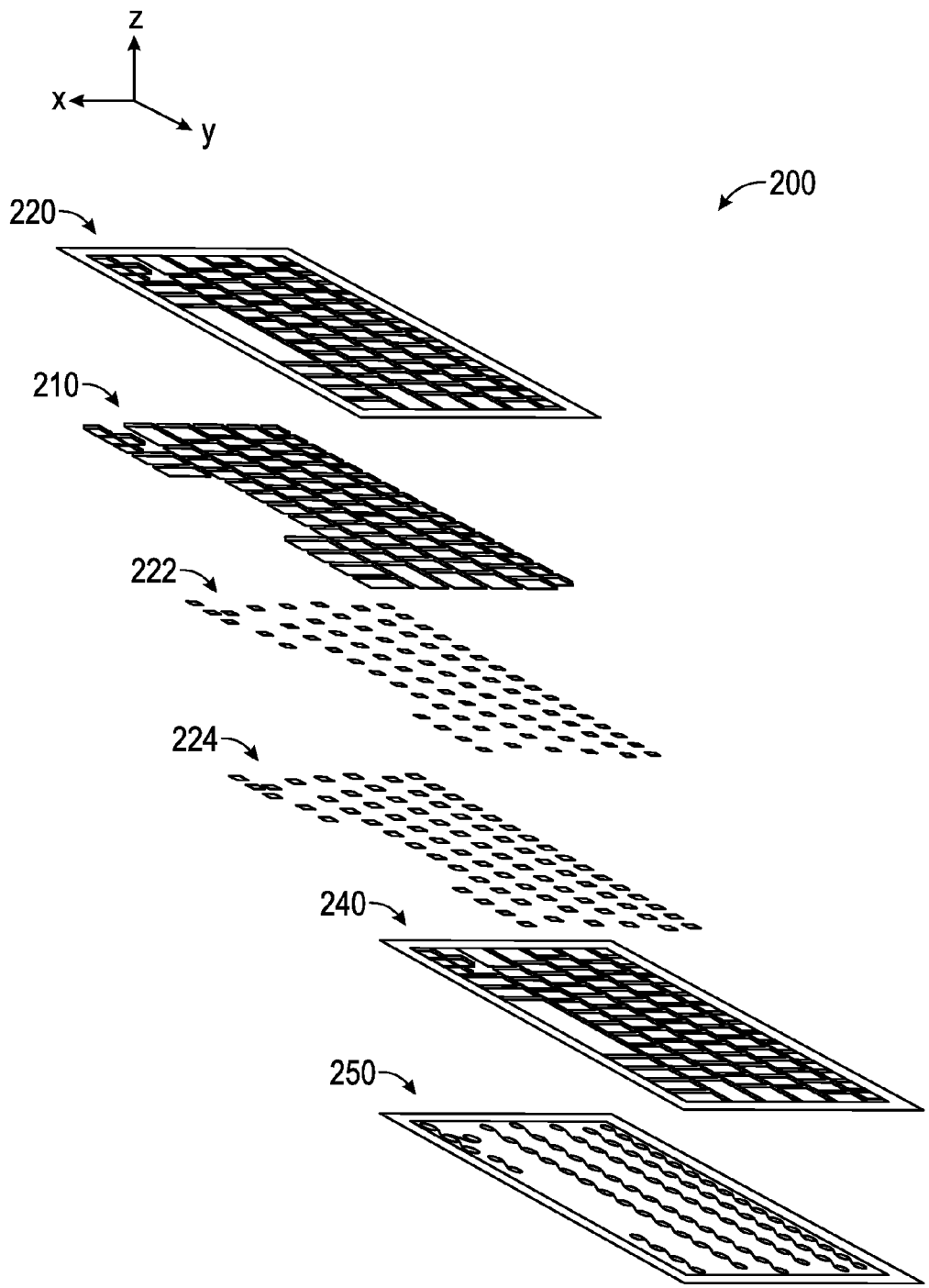
FIG. 2 shows an exploded view of an example keyboard in accordance with the techniques described herein.

FIG. 2 shows an exploded view of an example keyboard construction 200 in accordance with the techniques described herein. A construction like the keyboard construction 200 may be used to implement any number of different keyboards, including keyboard 100. Proceeding from the top to the bottom of the keyboard, the bezel 220 comprises a plurality of apertures through which keycaps 210 of various sizes are accessible in the final assembly. Magnetically coupled components 222, 224 are attached to the keycaps 210 or the base 240, respectively. The base 240 comprises a plurality of PTE mechanisms (illustrated as simple rectangles on the base 240) configured to guide the motion of the keycaps 210. Underneath the base 240 is a key sensor 250, which comprises one or more layers of circuitry disposed on one or more substrates.

Various details have been simplified for ease of understanding. For example, adhesives that may be used to bond components together are not shown. Also, various embodiments may have more or fewer components than shown in keyboard construction 200, or the components may be in a different order. For example, the base and the key sensor 250 may be combined into one component, or swapped in the stack-up order.

As an overview, the various embodiments described herein provide advantages attainable from the multi-function keys that are capable of detecting and distinguishing between two types, three types, or more types of input. Some multi-function keys are capable of sensing multiple levels of key depression, key depression force, location of touch on the key surface, etc. Some multi-function keys are capable of sensing and distinguishing between non-press touch (contact) on a key and a press on the key. This distinction between a contact input and press input is referred to herein as the "state" of the key (i.e., contacted or pressed). Some multi-function keys are capable of distinguishing between one, two or more unique input objects interacting with the key (i.e., a multi-object press). In some embodiments, the related function activated (response provided) by a press input depends upon the number of objects used to provide the press input. That is, a press input provided by a single object will activate a first function while a press input provided by a multi-object press will activate a second function. In some embodiments, the second function is related to the first function. In other embodiments the second function is provided until the multi-object press is removed (the key released). In other embodiments, the second function remains activated until the key assembly receives the multi-object press again. Additionally, it will be appreciated that the second function may be activated upon release of a pressed key as opposed to being activated upon pressing the key with multiple objects.

Multi-function keys may be configured with a touch sensitive surface using sensor systems of any appropriate technology, including any one or combination of technologies described in this detailed description section or by the references noted in the background section. As a specific example, in some embodiments, a sensor system for a key comprises a capacitive sensing system capable of detecting touch on the key and presses of the key. As another specific example, in some embodiments, a sensor system for a key comprises a capacitive sensing system capable of detecting touch on the key and a resistive membrane switch system capable of detecting presses of the key.

Multi-function keys can be used to enhance user interfaces, such as improving ergonomics, speeding up entry, extending the functionality of the key, providing more intuitive operation, etc. For example, multi-function keys configured in keypads and keyboards that capable of detecting and distinguishing between a single finger touch input and multi-finger touch input press input may enable additional functionality using a same key.

A "non-press touch input" or "contact input" as used herein to indicate input approximating a user contacting a key surface but not pressing the key surface sufficiently to cause a press input. A "press input" is used herein to indicate a user pressing a key surface sufficiently to trigger the main entry function of the key (e.g., to trigger alphanumeric entry for alphanumeric keys). In some embodiments, the sensor system is configured to consider the following as non-press touch input: inputs that contact the key surface, those inputs that lightly touch but does not significantly press the key surface, those inputs that press on the key surface slightly but do not fully depress the key, or a combination of these.

Figure 3:
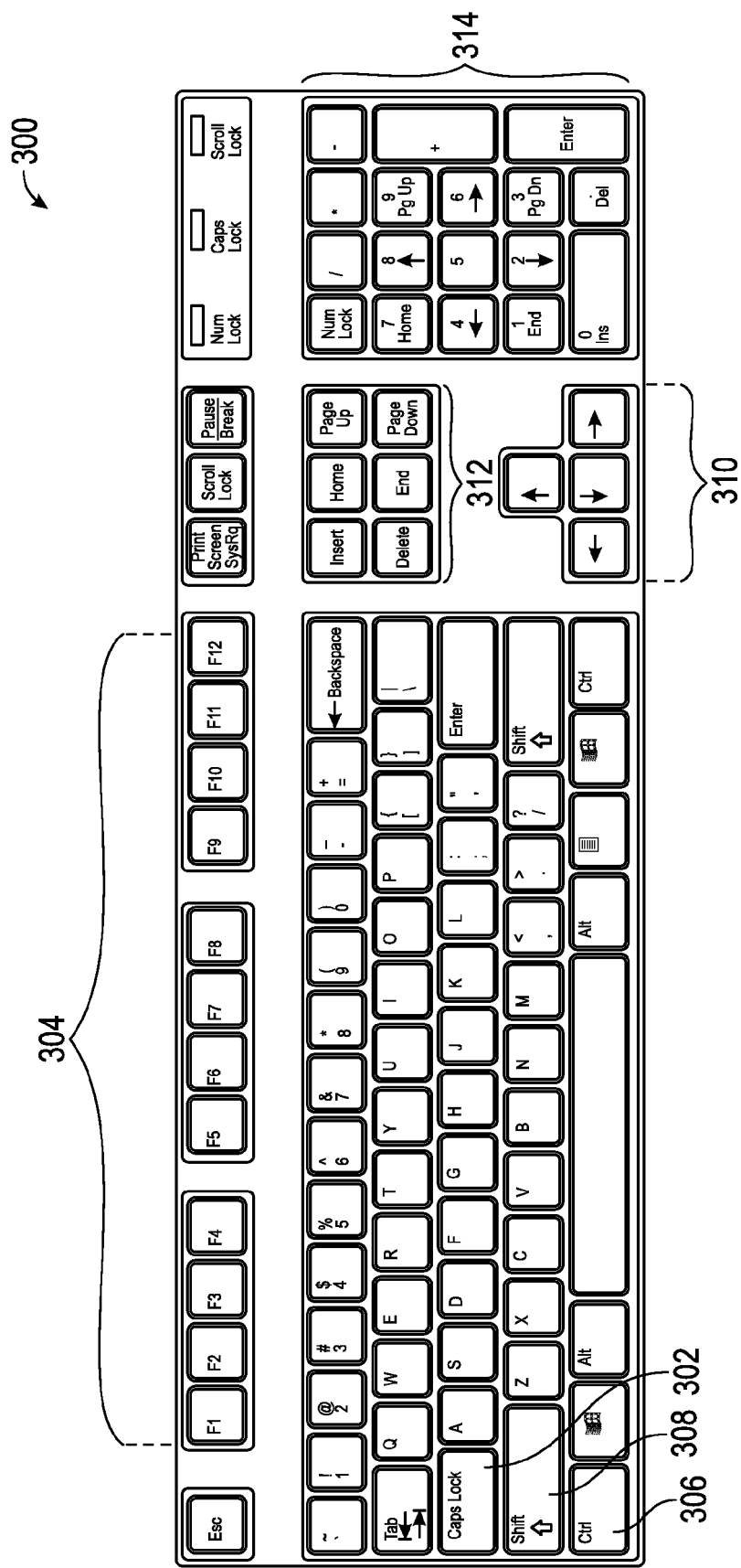

FIG. 3 illustrates an input device 300 (a keyboard in this example) having a plurality of key assemblies (e.g., 302). As can be seen the key assemblies include a label or legend (e.g., Shift, Caps Lock, A-Z, 0-9) that identifies to a user the function provided by pressing a respective key. Some keyboards also include function keys 304 that have more generic legends (e.g., F1, F2) that perform a function under control of a processing system or application program. In some embodiments, the function keys 304 can be programmed by the user to activate a programmed function or series of instructions (e.g., a macro). Some of all of the plurality of key assemblies shown in FIG. 3 include a touch surface (e.g., 306) as described above.

As is known, many publishers of programs or applications provide keyboard shortcuts to activate certain actions or functions. This frees the user from having to take a hand off the keyboard to use a mouse (or other navigation device) to locate and activate the function or action via menus. As will be appreciated, some publishers have extensive lists of keyboard shortcuts may tax the memory and frustrate some users. Moreover, keyboard shortcuts vary from publisher to publisher, which may further frustrate some users if multiple programs are running and the user is switching between programs.

Figure 4:
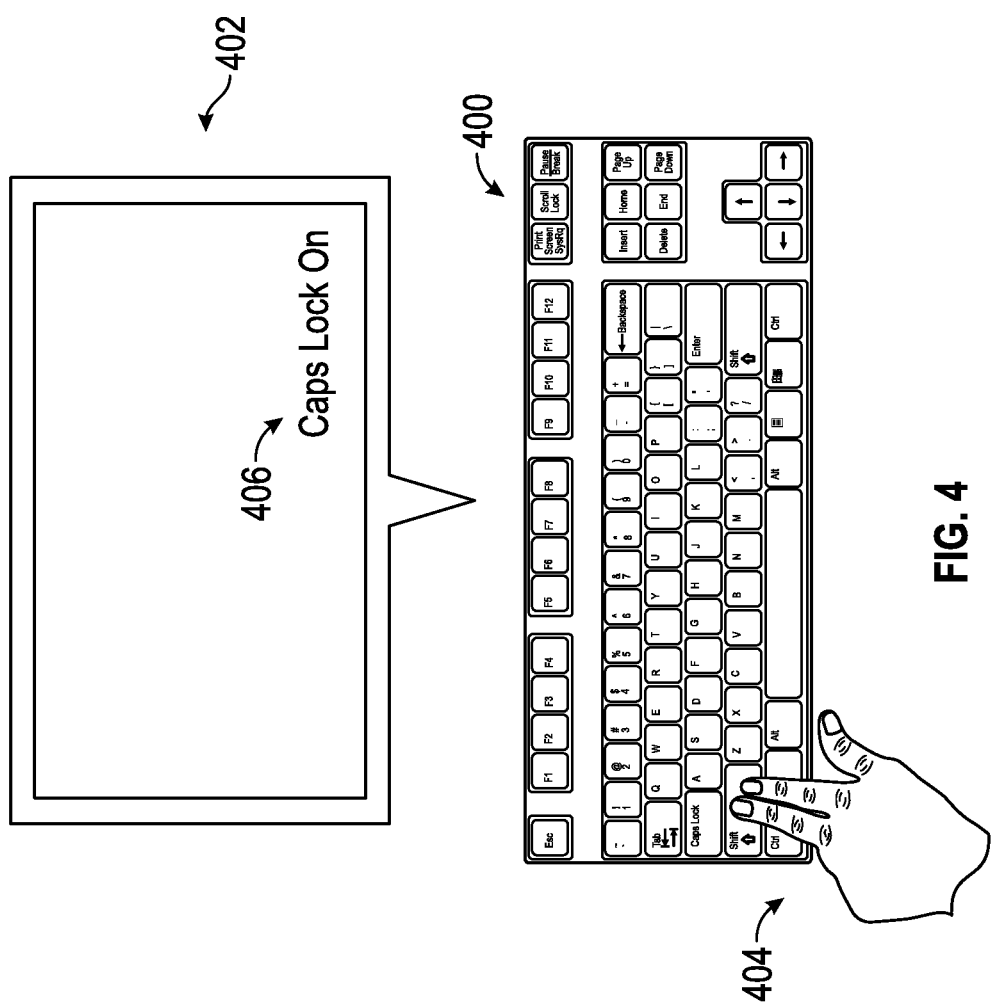

FIG. 4 illustrates one advantage of a multi-function key having additional functionality depending on the number of input objects interacting with the key. The input device 400 is coupled to a processing system (not shown in FIG. 4) which also coupled to a display 402. As a non-limiting example, a single input object (e.g., a finger) pressing on a "Shift" key results in the conventional response, in that subsequent letters pressed while the "Shift" key is pressed result in capitalized or modified characters. If multiple input objects 404 (e.g., two or more fingers) press and release the "shift" key, the resulting response is similar to that of a conventional "Caps Lock" key. In some embodiments, a message 406 (e.g., Caps Lock On) may be briefly presented to advise the user of the functionality activated by the multiple object key press. A subsequent single or multi-finger press and release of the "Shift" key will disable the caps lock function. In another example, the "Ctrl" or "Alt" keys can be placed in a lock mode if multiple input objects are sensed as pressing those keys.

In another example, a single finger press on a "Backspace" key results in a conventional behavior, which most commonly is the deletion of the previous character. If multiple inputs are placed on the "Backspace" key and the key is pressed, a related functionality may occur. For example, two input objects pressing the "Backspace" key may result in the deletion of the previous word; while three input object pressing the "Backspace" key may result in the deletion of a whole line or paragraph of text.

In yet another example, a single finger press on a "Return" or "Enter" key results in a conventional behavior, most commonly the movement of the text entry cursor to the next line in a text entry environment. If multiple inputs are sensed on the "Return" or "Enter" key and the key is pressed, different functionality may occur. For example, two fingers pressing the "Return" or "Enter" key may result in a page break or a double spacing.

In still another example, a single finger press on the spacebar key results in a conventional behavior, most commonly a spacing of the text entry cursor in a text entry environment. If multiple inputs are sensed on the spacebar key and the key is pressed, different functionality may occur. For example, two fingers pressing the spacebar key may result in a "." or ". " (period with a space) or ". " (period with a double space) to end a sentence.

In still another example, many keyboards have an "Fn" or "function" key that is used to allow additional input on existing alphanumeric keys. For example, while the "Fn" key is pressed, the "Home" and "End" buttons are used to control the brightness of the display. In accordance with the techniques disclosed herein, the "Fn" key may be realized by another multi-function key and activated based on the number of fingers (objects) pressing the –button. For example, when pressed with more than one finger the "Ctrl" key (306 in FIG. 3) may function like a "Fn" key without taking the space required for a separate key.

As yet another example, a single finger press on the "Tab" key results in a conventional behavior, most commonly used to advance the cursor to the next tab stop. If multiple inputs are sensed on the "Tab" key and the key is pressed, different functionality may occur. For example, two fingers pressing the "Tab" key may be used to reverse the cursor to the previous tab stop.

In another non-limiting example, a single finger press on the arrow keys (310 in FIG. 3) results in a conventional behavior, most commonly used to move the cursor in the relevant direction. If multiple input objects press one of the arrow keys, advanced functionality may occur. For example, two fingers pressing the up arrow may result in a "page up" action, two fingers pressing the down arrow may result in a "page down" action, two fingers pressing the right arrow may result in an "end" action, while two fingers pressing the left arrow may result in a "home" action. It will be understood that the mapping of the arrow keys may be reversed or otherwise arranged.

Additionally, keyboards with numeric keypads (314 in FIG. 3) may be realized with multi-function keys. For example, a single finger press on a number key on a keyboard (similar to that of FIG. 3) will result in a conventional response (e.g., pressing on the "1" key results in the number "1" being entered). In some embodiments, multiple input objects pressing on the "1" key may result in an advanced functionality, such as "!" being input (the equivalent of pressing Shift+1), or another character/symbol which is mapped to the "1" key.

Multi-function keys can also be used to provide an advantage if those keys are programmable (e.g., generic function keys 304 in FIG. 3). For example, a touch (contact) sense would cause a dialog box to indicate the programmed function. If the key (for example the "F2") was un-programmed, a message could appear indicating that the key was available to be programmed. With multi-function keys, the key could be reprogrammed by a multi-object press, and then later activated by a single object press of that key.

In FIGS. 5A and 5B, another advantage of multi-function keys is illustrated. In FIG. 5A, a user has entered the word "hello" via the keyboard 500 and has selected the word to provide selected text 502. Thereafter in FIG. 5B if a user makes a multi-finger touch on the Shift key, the selected text 502 has the functionality applied to it to provide in this example the all caps "HELLO" 502' as shown.

In some embodiments, a preview of the related functionality is provided upon sensing a multi-object contact of a key assembly. This preview function is particularly useful when a function provided by a key is not clearly indicated by the key label. As is known, many publishers of programs or applications provide keyboard shortcuts to activate certain actions or functions. This frees the user from having to take a hand off the keyboard to use a mouse (or other navigation device) to locate and activate the function or action via menus. As will be appreciated, some publishers have extensive lists of keyboard shortcuts may tax the memory and frustrate some users. Moreover, keyboard shortcuts vary from publisher to publisher, which may further frustrate some users if multiple programs are running and the user is switching between programs.

However, the use of multi-function keys provides a solution to aid a user from having to remember all of the keyboard shortcuts or which keyboard shortcuts are available in the active program. Using the Caps Lock example above, upon detecting two fingers touching the Shift key, a dialog box would appear indicating "Caps Lock" should the multi-object touch be followed by a multi-object press. In this way, the Shift key can also perform the function of the Caps Lock key to allow for a smaller keyboard. Although the label indicates a shift function, a multi-object touch indicates the related function of Caps Lock. After the multi-object press, the dialog box would indicate "Caps Lock On" to confirm activation of the related functionality. The preview function is particularly useful when a user is switching between operating environments (e.g., operating system, application program or macro) and the keyboard shortcuts vary depending upon the active operating environment. In some embodiments, after a preview is presented, a user may take the indicated action by pressing all keys currently being contacted. In other embodiments, after the preview is presented, a press into to any (one or more) of the contacted keys will cause the indication action to be taken. Also, some embodiments present the preview after a brief delay time so as not to be distracting to a user. In such embodiments a brief contact (but non-press) input will provide a preview of the function provided by the key.

Figure 6B:
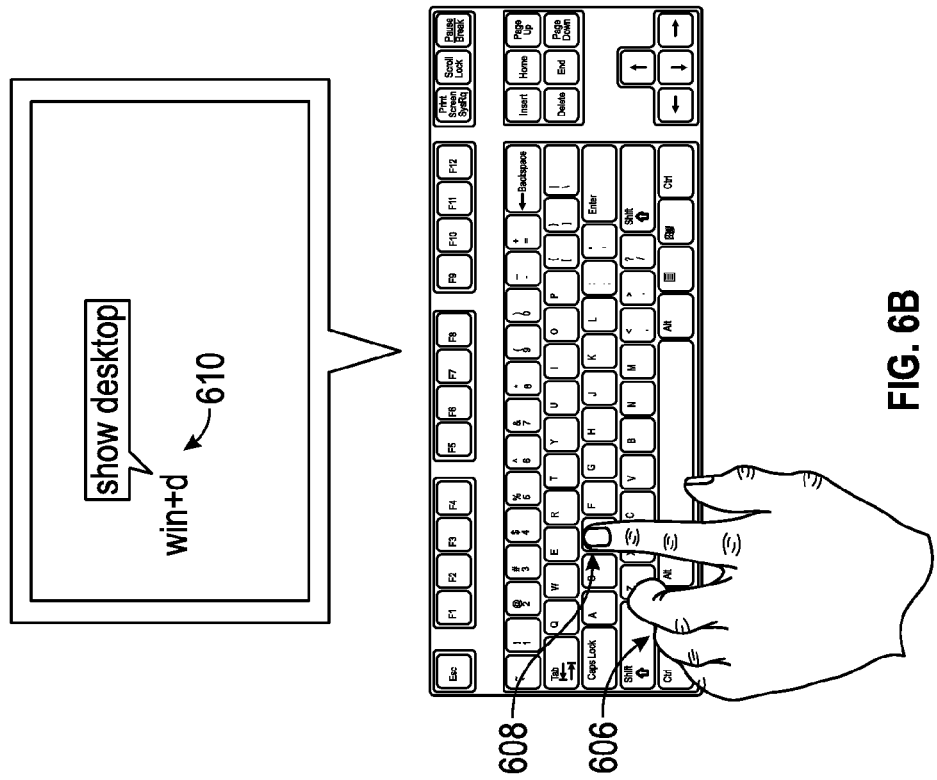
Figure 6A:
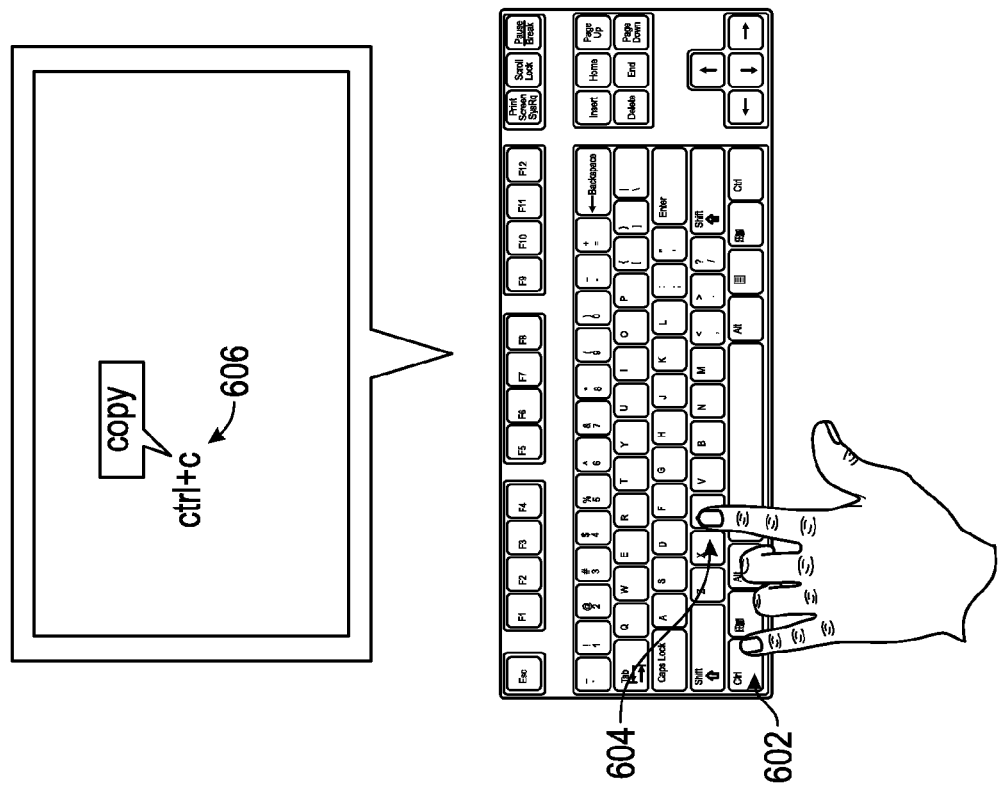

FIGS. 6A-6C illustrate examples of a user input on a multi-function key having additional resulting functionality depending on an input object having a non-press interaction (touch or contact) with the key. In FIG. 6A, a user operating an input device 600 (keyboard in this example) contacts or presses a "Ctrl" key 602 and performs non-press input with a second input object on the "C" key 604. In response to this combination of inputs, the processing system (not shown in FIG. 6A) displays a visual indication (e.g., cue or prompt) 806 notifying the user of what type of action the user may expect if the "Ctrl" and the "C" key is pressed—in this example a "copy" action. As used herein, a "visual indication" means a cue or prompt of an action that will occur if the corresponding contacted keys are pressed.

In another example, FIG. 6B illustrates a first input object contacting or pressing a "Win" key 606 and performs non-press input with a second input object on the "D" key 608 resulting in a visual indication of "show desktop" 610. If the user performs a press input on the "Win" key and the "D" key, the system would indeed show the desktop.

In yet another example, FIG. 6C illustrates a first input object performs non-press input on the "F1" key 612. In response, the electronic system displays a visual indication 614 to the user showing that a "help" menu will be presented if the user performs a press input on the "F1" key.

Modern computing and operating systems as well as the applications with which they operate (various operating environments) pack many shortcuts into keys such as the function keys, and into combinations of keys such as "Ctrl+key", "Alt+key" or "Win+key". Not only are the numerous shortcuts hard to remember, the shortcuts vary depending upon which operating environment is active at any one time. In various embodiments of the present invention, if the user performs a non-press input over a specific key (e.g., "F1" or at least one of a combination of keys (e.g., Ctrl+C) that has an associated keyboard shortcut, the processing system can prompt the application and/or operating system to display a visual indication (e.g., dialog box, cue or prompt) informing the user what shortcut, if any, is associated with the combination of keys. Thus, the user is provided visual cue to assist the user to decide whether they wish to complete the displayed action by completing the key press of the at least one key which was previously under non-press input.

FIGS. 7A-B illustrate another example where a user has previously used the keyboard 700 to enter the text "Hello Computer" 702 and has selected this text for a next action. Contacting or pressing the CTRL key 704 and providing a non-press input on the C key 706, a visual indication (dialog box) 708 that reveals that this particular combination of keys, if pressed, will copy the selected text. Further, if instead the user decides to move the non-pressing input previously on the C key 706 to the D key 710, a dialog box 712 will reveal that the new combination of keys, if pressed, will bring up the "Font" menu in the specific operating environment of this example for modifying the font of the selected text. It will be understood that in both cases, the text need not be selected in order to display the visual indications 708 or 712. The user may continue to move the non-pressing input object to discover what other actions a combination of key presses may result.

Furthermore, in yet another example, a first input object may interact with a multi-function key by swiping on the key surface (in either a pressed or non-pressed configuration), resulting in a "lock" of that key. Thus, pressing and swiping down on the CTRL key will activate a CTRL-Lock (similar to Caps Lock) after which the user may perform single finger (input object) or multi-finger non-press input on various keys. In response, the system will provide a prompt for the associated shortcut or action that would result from the pressing of the locked modifier key (e.g., Ctrl) and the key(s) currently contacted but not pressed.

FIGS. 8A-C illustrate another advantage offered by multi-function keys. If FIG. 10A, a user has used the keyboard 800 to enter the text "It was a dark and stormy night." 802. After selecting and copying this text as discussed above, the user may want to know what this text will look like pasted in a different location. Accordingly, in FIG. 8B, when the user has repositioned the text entry cursor to a new location and contacts the "Ctrl" key 804 and the "V" key 806 a visual representation 802' is display that shows the user what the current text or image on the clipboard (or other selection list) will look like pasted at the location of the cursor. Should the user then press the contacted keys, the action provided by the contacted keys would be implemented. As used herein, a "visual representation" means an illustration of the effects of the action if implemented, as opposed to a "visual indication" as defined above. In some embodiments, the clipboard 806 (FIG. 8C) contains several previously cut or copied images or text, and the user may navigate through the selection list items using a gesture (e.g., a flick or swipe) after contacting the V key as indicated by arrow 804. A single gesture causes a visual indication of the next selection list item (Clip 2 in this example) to appear at the cursor location. In some embodiments, a gesture 804 advances through the selection list items in a circular (or carrousel) manner as indicated by the arrow 808. In some embodiments, the gesture has a directional feature that facilitates next and previous navigation as indicated by the arrow 810. As a non-limiting example, a gesture in one direction (left to right) presents the visual indication of the next selection list item and a gesture in the opposite direction presents the visual indication of the previous selection list item.

Figure 9:
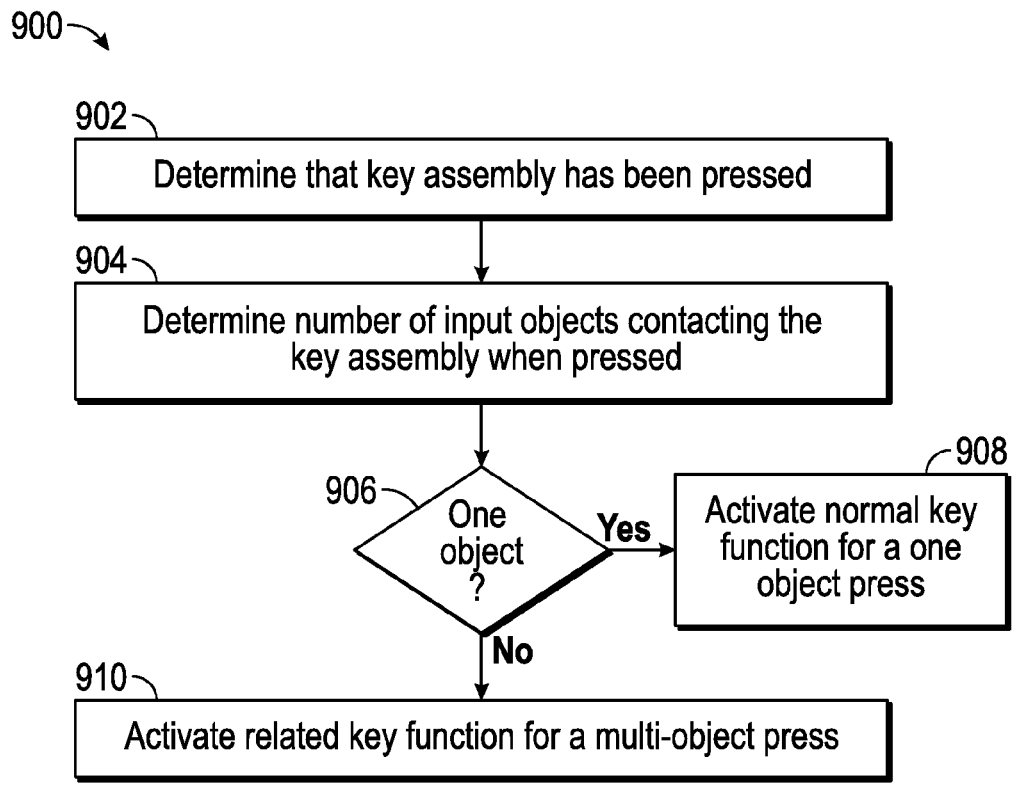
FIGS. 9-10 are flow diagrams presenting methods in accordance with the techniques described herein.

FIG. 9 is a flowchart of a method 900 in accordance with embodiments of the technology described herein. In step 902, a determination is made that a key assembly was pressed (activated). Next, step 904 determines of a number of objects contacting a key assembly when pressed. Decision 906 determines if only one object was in contact with the key assembly when the press input was received. If so, the normal function associated with that particular key assembly is activated in step 908. Conversely, if more than one object was contacting the key assembly when the press input was received, a related function or action is taken in step 910.

Figure 10:
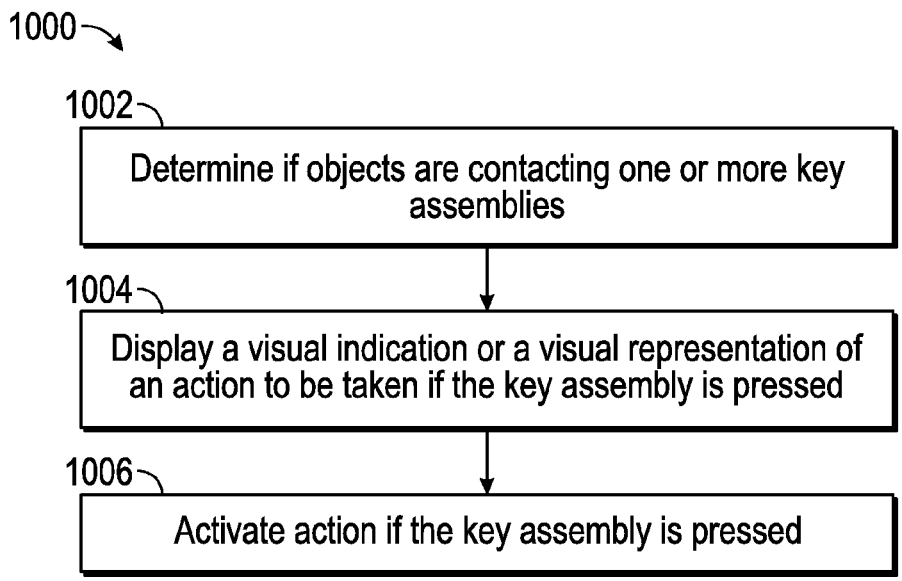

FIG. 10 is a flowchart of a method 1000 in accordance with embodiments of the technology described herein. In step 1002, a determination is made that input object(s) are contacting one or more key assemblies. Optionally, a determination could be made that an object is pressing one key assembly and contacting another key assembly. Next, step 1004 presents a visual indication (preview) of the action to be taken if the one or more key assemblies are pressed. Alternately, a visual representation could be presented as discuss in connection with FIG. 8. If the key assembly(ies) are pressed, the action associated the key or keys is activated in step 1006.

Thus, the techniques described herein can be used to implement any number of devices utilizing multi-function keys with touchsurface assemblies, including a variety of keyboards each comprising one or more key assemblies in accordance with the techniques described herein. The implementations described herein are meant as examples, and many variations are possible.

What is claimed is:

1. An input device, comprising:
   a plurality of key assemblies, at least some of the plurality of key assemblies having a touch sensitive surface;
   a processing system coupled to the plurality of key assemblies and configured to:
     determine whether a quantity of a first number of objects is greater than a single object, wherein the first number of objects is simultaneously contacting a respective key assembly among the plurality of key assemblies;
     determine whether the first number of objects simultaneously contacts the respective key assembly among the plurality of key assemblies without producing a key depression of the respective key assembly among the plurality of key assemblies;
     provide, in response to determining that the first number of objects simultaneously contacting the respective key assembly among the plurality of key assemblies failed to produce the key depression and the quantity of the first number of objects is greater than the single object, a preview visual representation of a first response within a display, wherein the preview visual representation shows an action taken when the respective key assembly among the plurality of key assemblies is pressed; and
     provide, in response to determining that the first number of objects produced the key depression, the first response within the display.

2. The input device of claim 1, further comprising providing a preview visual representation of a second response when the respective key assembly among the plurality of key assemblies has received a simultaneous contact input from a second number of objects, wherein the second number of objects is greater than the single object.

3. The input device of claim 2, wherein the respective key assembly among the plurality of key assemblies has a label indicating a first function provided by the first response and wherein the second response comprises a second function related to the label associated with the respective key assembly among the plurality of key assemblies.

4. The input device of claim 2, wherein the processing system is further configured to provide a third response when the respective key assembly among the plurality of key assemblies has received a press input from a third number of objects, wherein the third number of objects is greater than the single object.

5. The input device of claim 2, wherein the processing system is further configured to determine when the respective key assembly among the plurality of key assemblies has been released following a press input from the first number of objects, and to:
provide the second response for so long as the respective key assembly among the plurality of key assemblies is pressed by the second number of objects; and
ceasing to provide the second response when the respective key assembly among the plurality of key assemblies has been released following the press input from the second number of objects.

6. The input device of claim 2, wherein the processing system is further configured to determine when the respective key assembly among the plurality of key assemblies has been released following a press input from the first number of objects, and to:
provide the second response after the respective key assembly among the plurality of key assemblies receives a press input from the second number of objects and has been released following the press input from the second number of objects; and
continuing to provide the second response until the respective key assembly among the plurality of key assemblies receives the press input from the second number of objects and has been released following the press input from the second number of objects.

7. The input device of claim 1, wherein the respective key assembly among the plurality of key assemblies has a programmable function and the first response comprises enabling the programmable function to be reprogrammed.

8. The input device of claim 7, wherein a preview visual representation of the programmable function is provided when the respective key assembly among the plurality of key assemblies receives the simultaneous contact from the first number of objects.

9. The input device of claim 8, wherein when the programmable function of the respective key assembly among the plurality of key assemblies has not been assigned, the preview visual representation of the programmable function indicates that the programmable function is available to be programmed.

10. A method of activating multiple functions for a respective key assembly among a plurality of key assemblies, the method comprising:
determining whether a quantity of a first number of objects is greater than a single object, wherein the first number of objects is simultaneously contacting a touch sensitive surface of the respective key assembly among the plurality of key assemblies;
determining whether the first number of objects simultaneously contacts the touch sensitive surface of the respective key assembly among the plurality of key assemblies without producing a key depression of the respective key assembly among the plurality of key assemblies;
providing, in response to determining that the first number of objects simultaneously contacting the touch sensitive surface of the respective key assembly among the plurality of key assemblies failed to produce the key depression and the quantity of the first number of objects is greater than the single object, a preview visual representation of a first response within a display, wherein the preview visual representation shows an action taken when the touch sensitive surface of the respective key assembly among the plurality of key assemblies is pressed; and
providing, in response to determining that the first number of objects produced the key depression, the first response within the display.

11. The method of claim 10, further comprising providing a preview visual representation of a second response when the touch sensitive surface of the respective key assembly among the plurality of key assemblies receives a simultaneous contact from a second number of objects, wherein the second number of objects is greater than the single object.

12. The method of claim 11, further comprising providing a third response when a third number of objects provides a press input to the respective key assembly among the plurality of key assemblies, wherein the third number of objects is greater than the single object.

13. The method of claim 11, wherein the second response is activated while the respective key assembly among the plurality of key assemblies receives a press input from the second number of objects.

14. The method of claim 11, wherein the second response is activated when the respective key assembly among the plurality of key assemblies receives a press input from the second number of objects, and is deactivated when the respective key assembly among the plurality of key assemblies releases the press input from the second number of objects.

15. The method of claim 10, wherein the first response corresponds to a label on the respective key assembly among the plurality of key assemblies and the second response activates a function related to the label.

16. The method of claim 10, wherein the respective key assembly among the plurality of key assemblies has a programmable function and the first response enables the programmable function of the key assembly among the plurality of key assemblies to be reprogrammed.

17. A device, comprising:
a plurality of key assemblies, at least some of the plurality of key assemblies having a touch sensitive surface;
a display, coupled to a processing system for displaying information provided by the processing system; and
the processing system being coupled to the plurality of key assemblies and configured to:
determine whether a quantity of a first number of objects is greater than a single object, wherein the first number of objects is simultaneously contacting a respective key assembly among the plurality of key assemblies;
determine whether the first number of objects simultaneously contacts the respective key assembly among the plurality of key assemblies without producing a key depression of the respective key assembly among the plurality of key assemblies; and
provide, in response to determining that the first number of objects simultaneously contacting the respective key assembly among the plurality of key assemblies failed to produce the key depression and the quantity of the first number of objects is greater than the single object, a preview visual representation of a first response within the display, wherein the preview visual representation shows an action taken when the respective key assembly among the plurality of key assemblies is pressed; and
provide, in response to determining that the first number of objects produced the key depression, the first response within the display.

18. The input device of claim 17, wherein a preview visual representation of a second response is displayed on the display when the respective key assembly among the plurality of key assemblies has received a simultaneous contact input from a second number of objects, wherein the second number of objects is greater than the single object.

19. The device of claim 18, wherein the second response is activated after the respective key assembly among the plurality of key assemblies has received a press input from the second number of objects and is deactivated after the respective key assembly among the plurality of key assemblies has released the press input from the second number of objects.

20. The device of claim 17, wherein the first response is activated for so long as the first number of objects provides a press input.

* * * * *